(12) United States Patent
Yum et al.

(10) Patent No.: US 11,211,984 B2
(45) Date of Patent: Dec. 28, 2021

(54) METHOD FOR REPORTING CHANNEL STATE IN WIRELESS COMMUNICATION SYSTEM AND DEVICE THEREFOR

(71) Applicant: LG ELECTRONICS INC., Seoul (KR)

(72) Inventors: Kunil Yum, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/089,345

(22) PCT Filed: Mar. 23, 2017

(86) PCT No.: PCT/KR2017/003142
§ 371 (c)(1),
(2) Date: Sep. 27, 2018

(87) PCT Pub. No.: WO2017/171306
PCT Pub. Date: Oct. 5, 2017

(65) Prior Publication Data
US 2019/0115964 A1 Apr. 18, 2019

Related U.S. Application Data

(60) Provisional application No. 62/314,365, filed on Mar. 28, 2016.

(51) Int. Cl.
*H04B 7/06* (2006.01)
*H04W 72/04* (2009.01)
(Continued)

(52) U.S. Cl.
CPC ......... *H04B 7/0626* (2013.01); *H04B 7/0632* (2013.01); *H04B 17/24* (2015.01);
(Continued)

(58) Field of Classification Search
CPC ........ H04B 7/0626; H04B 7/24; H04B 7/309; H04B 7/0632; H04W 72/0446; H04W 24/10
(Continued)

(56) References Cited

FOREIGN PATENT DOCUMENTS

WO 2015012665 1/2015
WO WO-2017078603 A1 * 5/2017 ........... H04L 1/0073

OTHER PUBLICATIONS

"Remaining Details of Downlink Reference Signal Design", R1-161807 (Year: 2016).*
(Continued)

*Primary Examiner* — Yemane Mesfin
*Assistant Examiner* — Intekhaab A Siddiquee
(74) *Attorney, Agent, or Firm* — Lee Hong Degerman Kang Waimey

(57) ABSTRACT

The present invention relates to a method for reporting a channel state for a narrowband-Internet of Things (NB-IoT) terminal in a wireless communication system, the method, according to one embodiment of the present invention, being executed by a NB-IoT terminal configured so as to operate in a single resource block (BR)-unit NB, and comprising the steps of: receiving, from a base station, a request for the reporting of aperiodic channel state information; according to the request, calculating a channel quality indicator of at least one NB corresponding to a resource for which channel state information is being measured; and transmitting the calculated channel quality indicator to the base station, wherein the channel quality indicator is calculated during a valid subframe interval comprising at least one subframe, wherein the valid subframe interval may exclude a subframe in which a synchronization signal is transmitted from the at least one NB, or a subframe in which the terminal monitors a different NB that is not the at least one NB.

20 Claims, 6 Drawing Sheets

(51) Int. Cl.
*H04B 17/24* (2015.01)
*H04B 17/309* (2015.01)
*H04W 24/10* (2009.01)

(52) U.S. Cl.
CPC ...... *H04B 17/309* (2015.01); *H04W 72/0446* (2013.01); *H04W 24/10* (2013.01)

(58) Field of Classification Search
USPC ........................................................ 370/252
See application file for complete search history.

(56) References Cited

OTHER PUBLICATIONS

"Remaining issues on aperiodic CSI for Rel-13 eMTC", R1-160759 (Year: 2016).*
"NB-IoT—Timing relations", R1-160263 (Year: 2016).*
"Correction on aperiodic CSI reporting mode 1-0 and 1-1",R1-161059 (Year: 2016).*
"NB-IoT—NB-RS", RP-160269 (Year: 2016).*
"DCI for NB-IoT", R1-160323 (Year: 2016).*
"Further discussion on the reference signal design for NB-IoT", R1-160820 (Year: 2016).*
"NB-PUSCH design",R1-160325 (Year: 2016).*
U.S. Appl. No. 62/252,224 (Year: 2015).*
PCT International Application No. PCT/KR2017/003142, Written Opinion of the International Searching Authority dated Jun. 26, 2017, 18 pages.
LG Electronics, "Discussions on measurement for NB-IoT", 3GPP TSG RAN WG1 NB-IoT Ad-Hoc Meeting, R1-161969, Mar. 2016, 3 pages.
Huawei, et al., "Remaining Details of Downlink Reference Signal Design", 3GPP TSG RAN WG1 NB-IoT Ad-Hoc Meeting #2, R1-161807, Mar. 2016, 6 pages.
LG Electronics, "Remaining details on UCI supprt for NB-IoT", 3GPP TSG RAN WG1 NB-IoT Ad-Hoc Meeting, R1-161973, Mar. 2016, 4 pages.
Huawei, et al., "Remaining issues on aperiodic CSI for Rel-13 eMTC", 3GPP TSG RAN WG1 Meeting #84, R1-160759, Feb. 2016, 4 pages.

* cited by examiner

METHOD FOR REPORTING CHANNEL STATE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/003142, filed on Mar. 23, 2017, which claims the benefit of U.S. Provisional Application No. 62/314,365, filed on Mar. 28, 2016, the contents of which are all hereby incorporated by reference herein in their entirety.

TECHNICAL FIELD

The present invention relates to a wireless communication system, and more particularly, to a method of reporting a channel state and an apparatus therefor.

BACKGROUND ART

A next generation system such as LTE (Long Term Evolution), GERAN (GSM EDGE Radio Access Network), and the like considers configuring a UE of low cost/low specification mainly performing data communication such as metering, measuring a water level, utilizing a surveillance camera, inventory reporting of a vending machine and the like. This sort of network is referred to as Internet-of-Things (IoT). Unlike a legacy IoT, IoT designed or configured to operate on a narrowband only is referred to as NB (narrowband)-IoT. More specifically, it is assumed that a NB-IoT UE operates on a narrowband narrower than 1RB (200 kHz) and the NB-IoT UE is targeting low power consumption and low complexity/cost. In particular, the NB-IoT UE assumes a situation that the NB-IoT UE operates in poor environment (e.g., basement). In order to reliably perform transmission in the situation, the NB-IoT UE basically considers extending coverage. In particular, a basic target of the NB-IoT UE is to reduce a reception failure probability by repeatedly transmitting a signal/data. In particular, an object of the NB-IoT is to make a UE in a poor channel state smoothly perform communication.

The present specification intends to propose a method of aperiodically reporting a channel state for the NB-IoT UE in the abovementioned situation.

DISCLOSURE OF THE INVENTION

Technical Task

A technical task of the present invention is to provide a method of reporting a channel state. More specifically, an object of the present invention is to provide a method of aperiodically reporting a channel state for a NB-IoT UE.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting a channel state, which is reported by an NB-IoT (narrowband-Internet of Things) user equipment (UE) configured to operate within one resource block (RB) unit of NB in a wireless communication system, includes receiving a reporting request of aperiodic channel state information from a base station, calculating a channel quality indicator of one or more NBs corresponding to channel state information measurement target resources according to the request, and transmitting the calculated channel quality indicator to the base station. In this case, the channel quality indicator is calculated during a valid subframe period including one or more subframes and the valid subframe period may exclude a subframe in which a synchronization signal is transmitted or a subframe in which a NB other than the one or more NBs is monitored by the UE.

Additionally or alternatively, the channel quality indicator may be transmitted on an uplink data channel dedicatedly used for reporting the aperiodic channel state information.

Additionally or alternatively, a subframe in which the uplink data channel is to be transmitted is indicated by control information that carries the reporting request of the aperiodic channel state information or be designated to a subframe after a predetermined number of subframes from a subframe in which the control information is received.

Additionally or alternatively, the uplink data channel may be repeatedly transmitted as many as a number configured by the base station.

Additionally or alternatively, the reporting request of the aperiodic channel state information may include a repetition number which is considered when calculating the channel quality indicator or information on a narrowband set.

Additionally or alternatively, the valid subframe period may include a predetermined number of subframes, the predetermined number corresponding to a repetition transmission number configured for the UE or the maximum repetition transmission number configured for the UE.

Additionally or alternatively, the channel state information measurement target resources may include all NBs capable of being used by the UE.

Additionally or alternatively, when the channel quality indicator is calculated, if the UE is configured by a guard band/standalone operation mode, a symbol for control signaling may be assumed not to exist in the channel state information measurement target resources.

Additionally or alternatively, when the channel quality indicator is calculated, if a physical layer cell identifier-related indicator is set to true for the UE, CRS overhead corresponding to the number of cell-specific reference signal (CRS) antenna ports of the base station may be assumed.

Additionally or alternatively, when the channel quality indicator is calculated, if a CRS of the base station is used, energy per resource element (EPRE) of the CRS to NB-RS (NRS) of the base station can be received from the base station.

To further achieve these and other advantages and in accordance with the purpose of the present invention, according to a different embodiment, an NB-IoT (narrowband-Internet of Things) user equipment (UE) configured to receive a downlink signal in a wireless communication, the NB-IoT UE configured to operate within one resource block (RB) unit of NB includes a transmitter and a receiver, and a processor that controls the transmitter and the receiver, wherein the processor receives a reporting request of aperiodic channel state information from a base station, calculates a channel quality indicator of one or more NBs corresponding to channel state information measurement target resources according to the request, transmits the calculated channel quality indicator to the base station. In this case, the channel quality indicator is calculated during a valid subframe period including one or more subframes and the valid subframe period can exclude a subframe in which a synchronization signal is transmitted or a subframe in which a NB other than the one or more NBs is monitored by the UE.

Additionally or alternatively, the channel quality indicator may be transmitted on an uplink data channel dedicatedly used for reporting the aperiodic channel state information.

Additionally or alternatively, a subframe in which the uplink data channel is to be transmitted may be indicated by control information that carries the reporting request of the aperiodic channel state information or be designated by a subframe after the certain number of subframes from a subframe in which the control information is received.

Additionally or alternatively, the uplink data channel may be repeatedly transmitted as many as a number configured by the base station.

Additionally or alternatively, the reporting request of the aperiodic channel state information may include a repetition number which is considered when calculating the channel quality indicator or information on a narrowband set.

Additionally or alternatively, the valid subframe period may include a predetermined number of subframes, the predetermined number corresponding to a repetition transmission number configured for the UE or the maximum repetition number configured for the UE.

Additionally or alternatively, the channel state information measurement target resources may include all NBs capable of being used by the UE.

Additionally or alternatively, when the channel quality indicator is calculated, if the UE is configured by a guard band/standalone operation mode, a symbol for control signaling may be assumed not to exist in the channel state information measurement target resources.

Additionally or alternatively, when the channel quality indicator is calculated, if a physical layer cell identifier-related indicator is set to true for the UE, CRS overhead corresponding to the number of cell-specific reference signal (CRS) antenna ports of the base station may be assumed.

Additionally or alternatively, when the channel quality indicator is calculated, if a CRS of the base station is used, energy per resource element (EPRE) of the CRS to NB-RS (NRS) of the base station may be received from the base station.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to embodiments of the present invention, it is able to efficiently transmit and receive a downlink reference signal for CIoT and it is able to efficiently measure a channel according to the downlink reference signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode For Invention

Figure 1:
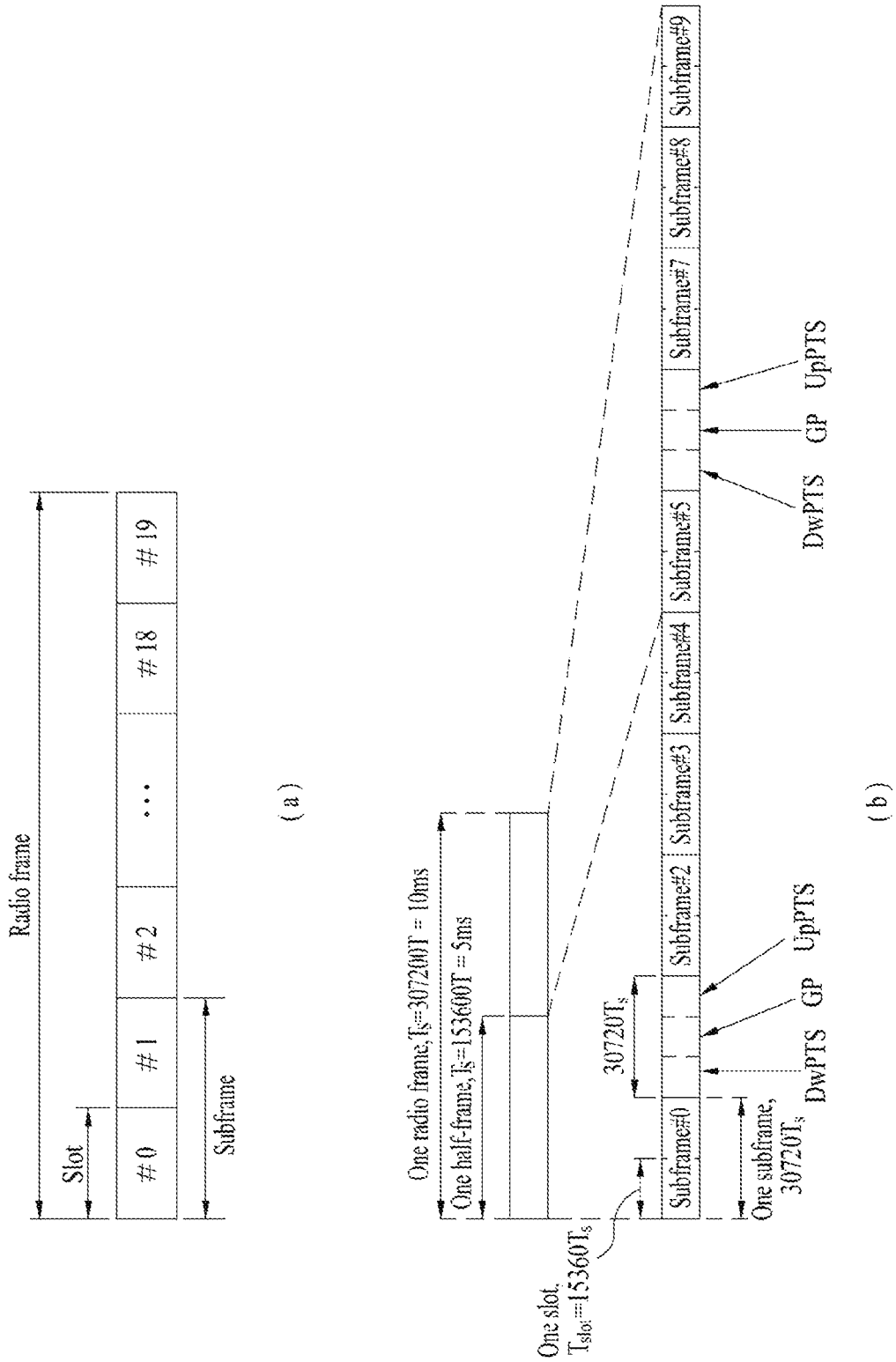
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
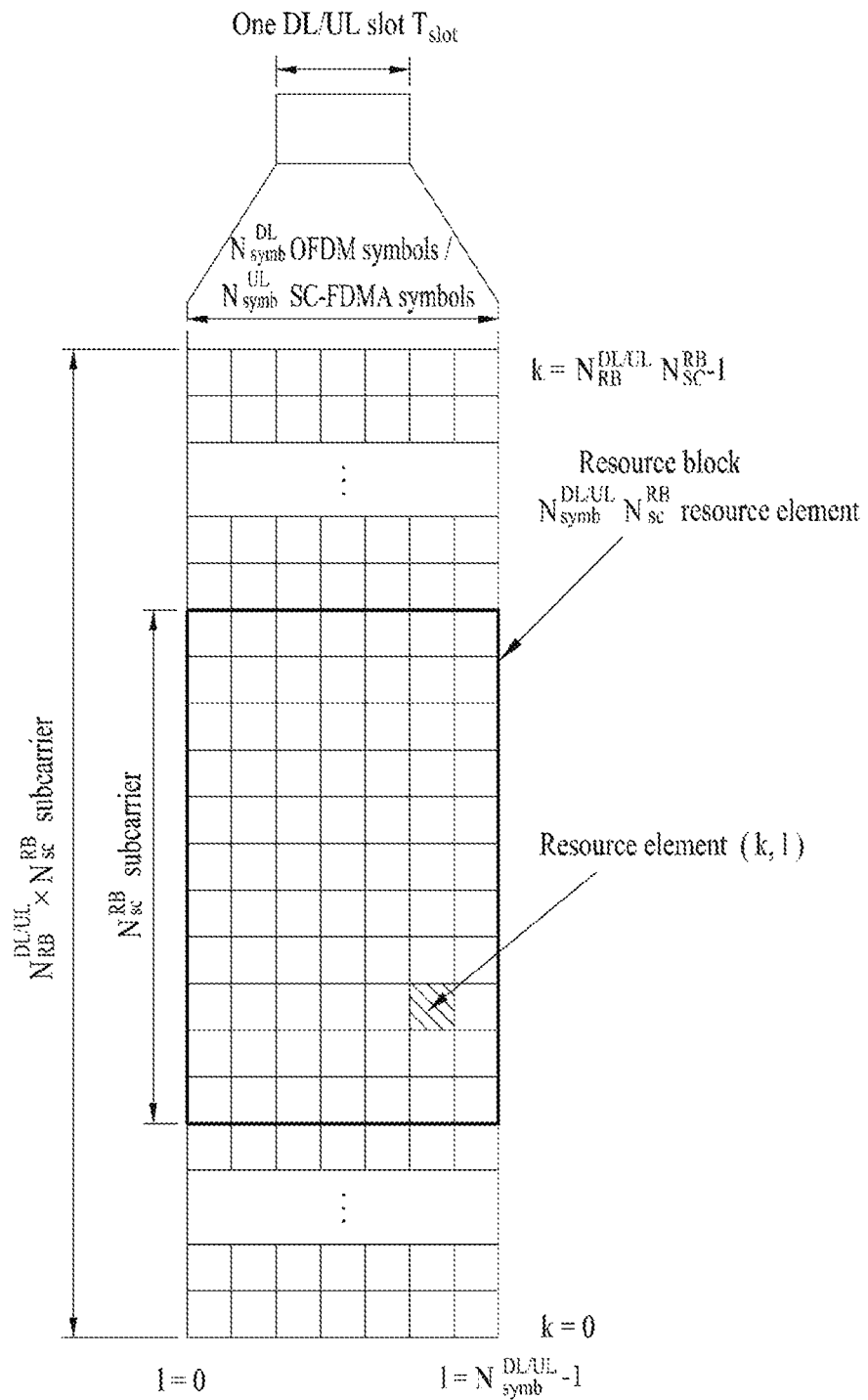
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{SC}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{SC}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{SC}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{SC}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} N_{SC}^{RB}$ REs. Each RE in a resource grid can be uniquely defined by an index pair (k, l) in a slot. Here, k is an index in the range

TABLE 2

| | Normal cyclic prefix in downlink | | | Extended cyclic prefix in downlink | | |
|---|---|---|---|---|---|---|
| | | UpPTS | | | UpPTS | |
| Special subframe configuraion | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | of 0 to $N_{symb}^{DL/UL} * N_{SC}^{RB} -1$ in the frequency domain and 1 is an index in the range of 0 to $N_{symb}^{DL/UL}-1$.

Two RBs that occupy $N_{SC}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and VRB=$N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
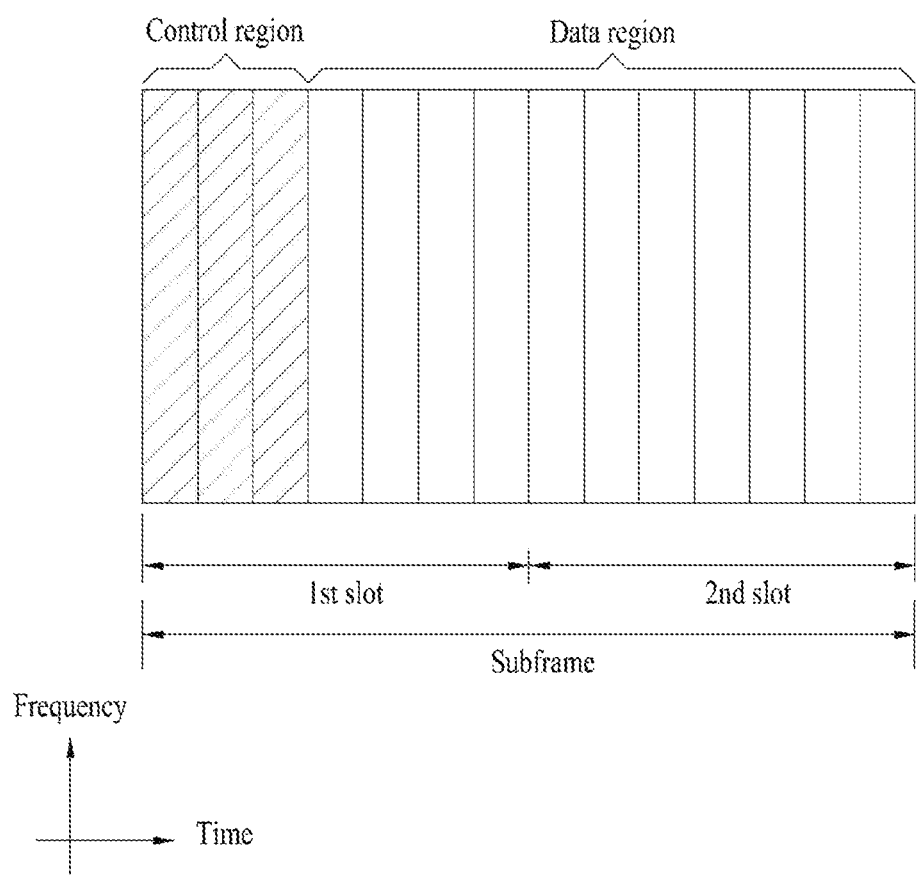
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
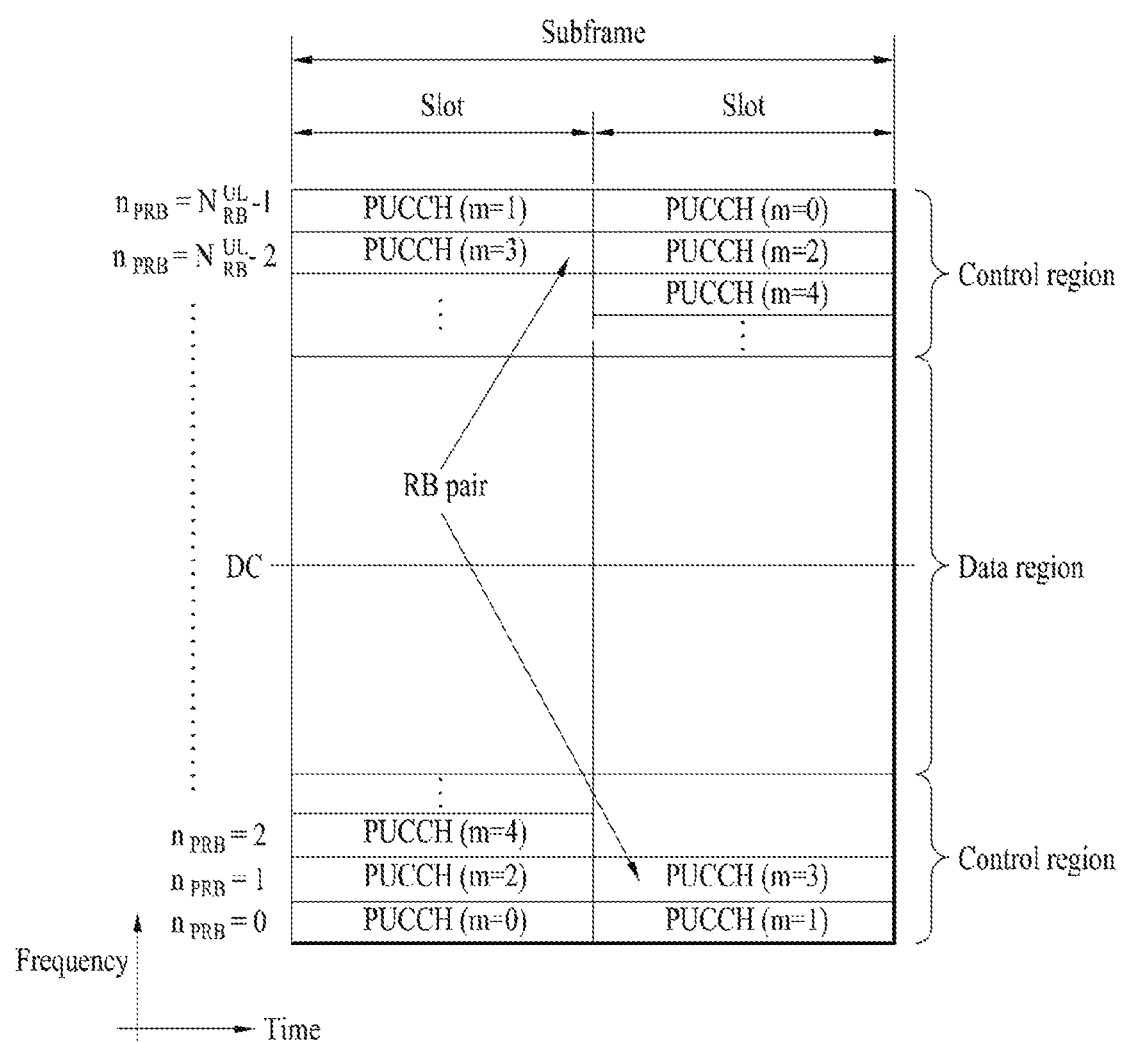
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | PMI Feedback Type | | |
|---|---|---|---|
| | No PMI | Single PMI | Multiple PMIs |
| PUSCH CQI Feedback Type | Wideband (Wideband CQI) | | Mode 1-2 RI 1st wideband CQI(4 bit) 2nd wideband |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband<br>CQI(4 bit) + Best-M<br>CQI(2 bit)<br>(Best-M CQI: An average CQI for M SBs selected from among N SBs)<br>Best-M index (L bit) | | CQI(4 bit)<br>if RI > 1<br>N*Subband PMI(4 bit)<br>(N is the total # of subbands)<br>(if 8Tx Ant, N*subband W2 + wideband W1)<br>Mode 2-2<br>RI<br>1st wideband<br>CQI(4 bit) + Best-M<br>CQI(2 bit)<br>2nd wideband<br>CQI(4 bit) + Best-M<br>CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband<br>CQI(4 bit) +<br>N*subbandCQI(2 bit) | Mode 3-1<br>RI<br>1st wideband<br>CQI(4 bit) +<br>N*subbandCQI(2 bit)<br>2nd wideband<br>CQI(4 bit) +<br>N*subbandCQI(2 bit)<br>if RI > 1<br>Wideband PMI(4 bit)<br>(if 8Tx Ant, wideband W2 + wideband W1) | Mode 3-2<br>RI<br>1st wideband<br>CQI(4 bit) +<br>N*subbandCQI(2 bit)<br>2nd wideband<br>CQI(4 bit) +<br>N*subbandCQI(2 bit)<br>if RI > 1<br>N*Subband PMI(4 bit)<br>(N is the total # of subbands)<br>(if 8Tx Ant, N*subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI >1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.
ix) Type 7: the UE transmits a CRI(CSI-RS resource indicator) and an RI.
x) Type 8: the UE transmits a CRI, an RI and a WB PMI.
xi) Type 9: the UE transmits a CRI, an RI and a PTI (precoding type indication).
xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
|---|---|
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
|---|---|
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

A next generation system such as LTE (Long Term Evolution), GERAN (GSM EDGE Radio Access Network), and the like considers configuring a UE of low cost/low specification mainly performing data communication such as metering, measuring a water level, utilizing a surveillance camera, inventory reporting of a vending machine and the like. This sort of network is referred to as Internet-of-Things (IoT). Unlike a legacy IoT, IoT designed or configured to operate on a narrowband only is referred to as NB (narrowband)-IoT. More specifically, it is assumed that a NB-IoT UE operates on a narrowband narrower than 1RB (200 kHz) and the NB-IoT UE is targeting low power consumption and low complexity/cost. In particular, the NB-IoT UE assumes a situation that the NB-IoT UE operates in poor environment (e.g., basement). In order to reliably perform transmission in the situation, the NB-IoT UE basically considers extending coverage. In particular, a basic target of the NB-IoT UE is to reduce a reception failure probability by repeatedly transmitting a signal/data. In particular, an object of the NB-IoT is to make a UE in a poor channel state smoothly perform communication.

In NB-IoT environment, it may use aperiodic CSI report. Since NB-IoT uses a narrowband (NB) of 1 RB, it is necessary to define an operation different from an operation of legacy LTE. To this end, a UE may inform a base station of information on "aperiodic capable" of the UE by including the information in UE capability signaling via higher layer signaling such as RRC. Or, the base station may provide an aperiodic CSI configuration to the UE to enable the UE to receive an aperiodic CSI trigger. If it is determined that the UE does not need aperiodic CSI feedback, the base station may not provide the configuration to the UE. In this case, the UE can perform aperiodic CSI measurement only when the UE receives the aperiodic CSI configuration.

Measurement Target

A. Frequency Band

A UE measures an RS included in a reference resource to feedback aperiodic CSI. In this case, frequency bands to be measured by the UE are described in the following.

i. An NB on which the UE is currently operating
   1. When frequency hopping or NB hopping for the UE is not used, it may be able to inform a base station of a CQI of an NB currently used by the UE.
   2. Or, it may be able to inform the base station of a CQI for a specific NB to enable the UE to perform transmission using a different NB.
ii. Monitoring NBs of the UE
   Monitoring NBs may become a set of NBs configured as a hopping band. In particular, when feedback is performed on wideband CQI, it may be able to inform the base station of CQI at the time of using hopping.
iii. Set S subbands configured by higher layer signaling such as RRC
   A corresponding subband may become an NB unit rather than a subband configured in legacy LTE. In this case, a set S subband includes a currently not monitored NB and can be used for determining a new hopping NB set.
iv. Whole NB
   1. In case of an in-band operation, an LTE system bandwidth may become a target. In this case, the in-band operation may correspond to an operation of an NB-IoT UE operating on a legacy LTE band.
   2. In case of a standalone operation or a guard band operation, if the whole of NBs capable of being used by a UE are defined, the NBs may become a target. In this case, the standalone operation may correspond to an operation on a separate band rather than a legacy LTE band and the guard band operation may correspond to an operation on a legacy LTE guard band.
   In case of the aforementioned "set S subbands" and the "whole NB", it may be able to configure such a separate section for performing measurement as a measurement gap to support measurement for an NB currently or previously not measured by a UE.

B. Time Duration
   When a UE draws CSI for aperiodic CSI feedback, the UE may use a reference resource corresponding to a valid subframe among subframes within a prescribed duration. A method of using the reference resource is described in the following.
   i. Start point
      1. From a subframe in which an aperiodic CSI trigger (aperiodic CSI request) is received
      A reference resource can be extended to a subframe appearing after a subframe in which an aperiodic CSI trigger is received as much as "time duration". In particular, when the subframe in which the aperiodic CSI trigger is received corresponds to a subframe #n, aperiodic CSI feedback timing of a UE may corresponds to a subframe #(n+"duration"−1)+4 or a subframe #max (n+"duration"−1, 4)).
      2. From a subframe appearing prior to a subframe in which an aperiodic CSI trigger is received as much as "duration"
      A reference resource can be extended to a subframe appearing prior to a subframe in which an aperiodic CSI trigger is received as much as "duration". In particular, when the subframe in which the aperiodic CSI trigger is received corresponds to a subframe #n, a subframe at which a reference resource of aperiodic CSI starts may correspond to a subframe #(n−"duration"+1) and aperiodic CSI feedback timing of a UE may correspond to a subframe #(n+4).
   ii. Duration
      1. One Subframe
      A UE can calculate or draw aperiodic CSI on the basis of a subframe in which an aperiodic CSI trigger is received. In this case, the UE emulates a specific repetition number and calculates and reports CQI by assuming the specific repetition number. The repetition number may correspond to a repetition number set to the UE or the maximum repetition number. Or, the UE may be able to calculate CQI by assuming a repetition number determined by the UE as being appropriate and report the repetition number together with the calculated CQI.
      2. Configured Repetition Number
      A UE can calculate and report CQI using reference resources included in subframes as many as a repetition number set to the UE. In this case, the UE can calculate and report CQI for two or more repetition numbers. The repetition numbers can be signaled via higher layer signaling such as RRC or the like in advance. Or, the repetition numbers are determined by the UE to calculate CQI and the UE can feedback the repetition numbers together with the CQI.
      3. Maximum Repetition Number
      A UE can calculate and report CQI using reference resources included in subframes as many as the maximum repetition numbers capable of being used by the UE or the maximum repetition numbers configured by a base station via higher layer signaling such as RRC. In this case, the UE can calculate and report CQI for two or more repetition numbers. The repetition numbers can be signaled via higher layer signaling such as RRC or the like in advance. Or, the repetition numbers can be determined by the UE to calculate CQI and the UE can feedback the repetition numbers together with the CQI.

C. Reference Signal
   i. Such a new reference signal as an NRS (narrowband RS) is defined for NB-IoT. An NB-IoT UE measures the NRS to calculate and report CQI.
   ii. In case of an in-band operation, a UE may use a legacy CRS for measurement according to "same-PCI indicator". In particular, if the "same-PCI indicator" is set to 'true' in an in-band operation, the UE is able to use an NRS and a CRS to calculate and report CQI. In this case, the "same-PCI indicator" corresponds to an indicator indicating whether or not an NB PCI (physical layer cell identifier) of a corresponding cell is identical to a (legacy) PCI to an NB-IoT UE. In particular, if the "same-PCI indicator" is set to 'true', it indicates that a serving cell of a corresponding cell transmits a CRS on a corresponding NB as well. Hence, a UE is able to use the CRS to calculate and report CQI.
      1. In an in-band operation mode of which the "same-PCI indicator" is set to 'true', whether or not an NB-IoT UE calculates and reports CQI using a CRS can be configured via higher layer signaling such as RRC or the like.

Feedback Method
A. Feedback Target
   i. CQI Only
   A UE can report CQI using a designated NB (or NB set) and a repetition number only to a base station. In particular, if a plurality of repetition numbers and/or a plurality of NB (set) candidates are designated to the UE, the UE calculates CQI for each of a plurality of the repetition numbers and/or each of a plurality of the NB (set) candidates to report a plurality of CQIs. In this case, it may assume that CQI and a repetition number are reported together by mapping the CQIs to the repetition numbers according to each order. In particular, the first CQI assumes the first repetition number, the second CQI assumes the second repetition number, and so on. In particular, it can be comprehended it as CQI and the repetition number assumed to calculate the CQI. The above-mentioned order follows a configuration of a repetition number. The order can be identically applied to mapping between CQI and an NB (set). When a plurality of repetition numbers and a plurality of NB (set) candidates are set, it is able to map a repetition number first and an NB (set) later. In particular, it is able to perform mapping in an order of CQI–NB (set)—repetition number. The abovementioned order can be used in a reverse order.

ii. CQI+Repetition Number

A UE can feedback a repetition number used for calculating CQI together with the CQI. In particular, the UE uses candidates of a plurality of repetition numbers, calculates CQI for each of the candidates, and can report a plurality of pairs of CQI+repetition number. In this case, it may assume that CQI and a repetition number are reported together by mapping the CQI to the repetition number according to each order. In particular, the first CQI assumes the first repetition number, the second CQI assumes the second repetition number, and so on. In particular, it can be comprehended it as CQI and the repetition number assumed to calculate the CQI. In this case, it may be able to report the best N number of pairs of CQI+repetition number only.

iii. CQI+NB

A UE can feedback an NB or an NB set used for calculating CQI together with the CQI. The NB (set) can be transmitted via higher layer signaling such as RRC or the like. In particular, when a pair of CQI+NB (set) is transmitted, it may be able to report the best N number of pairs only. In case of a pair of CQI+NB, the N is configured by the number of hopping NBs. By doing so, it may have an effect that the UE is able to set a desired hopping NB set.

B. Media i. RE Mapping for Piggyback

A UE can report aperiodic CSI via piggyback. However, in case of NB-IoT, since an RI and PMI are not transmitted, it may be able to report CSI by piggybacking the CSI using RE mapping different from RE mapping of LTE. In particular, it may be able to transmit CQI in an RE adjacent to a UL DMRS. A legacy RI and PMI are transmitted in the RE. If the UE transmits repetition number and/or NB (set) assumption together with CQI, the repetition number is transmitted in the RE in which the RI is transmitted and the CQI can be transmitted in a PMI or a legacy CQI location. In this case, the repetition number follows repetition of a corresponding UL subframe. Or, the repetition number may follow a repetition number such as aperiodic CSI configuration configured via higher layer signaling such as RRC in a subframe in which aperiodic CSI is included only.

ii. Additional PUSCH Instance

A UE can perform transmission using a UL PUSCH subframe for aperiodic CSI only instead of piggyback. In this case, the aperiodic CSI is transmitted using all or a part of a UL subframe and a different UL data may not be transmitted in the subframe. The additional UL PUSCH subframe can be directly scheduled by UL DCI including an aperiodic CSI trigger (or request) or can be designated as a UL subframe having a prescribed offset by the UL DCI. The offset can be transmitted to the UE by a base station via higher layer signaling such as RRC signaling like an aperiodic CSI configuration.

In this case, a repetition number of the subframe may follow a repetition number configured by the aperiodic CSI configuration. Or, the repetition number can be directly designated by the UL DCI.

Triggering

A base station can transmit an aperiodic CSI request to a UE via UL DCI. Basically, it may assume a form identical to legacy LTE.

A. 1-Bit Indicator on UL DCI

A base station can trigger aperiodic CSI to a UE via 1-bit signaling.

B. 2-Bit Indicator on UL DCI

A base station can trigger aperiodic CSI to a UE via 2-bit signaling. In this case, the 2-bit signaling can designate one of a repetition number predefined via higher layer signaling such as RRC and/or NB (set) assumption.

Reference Resource

A UE performs channel measurement using a resource corresponding to a valid subframe only as a reference resource. In this case, the valid subframe may be able to basically use a valid subframe designated by MTC (machine type communication). In this case, it may include the following for NB-IoT.

A subframe in a serving cell shall be considered to be a valid downlink or a valid special subframe except if the UE is configured as NB-IoT UE and is monitoring the PSS/SSS (primary synchronization signal/secondary synchronization signal) monitoring carrier (NB or a band corresponding to the NB), and PSS or SSS is transmitted in the subframe, or except if the UE is configured as NB-IoT UE and different carrier is monitored at the subframe with the carrier other than the target carriers (NB or a band corresponding to the NB).

A target carrier corresponds to a frequency band becoming the aforementioned measurement target. In particular, the target carrier may target a repetition number and/or an NB (set) at the timing of reporting aperiodic CSI reported by a UE. For example, when a UE not using hopping is configured to receive an aperiodic CSI trigger and is configured to perform transmission by moving to a different PRB, if timing of reporting aperiodic CSI appears after the timing of moving to the PRB, the UE calculates and reports CQI for the PRB after the movement. Or, when a UE using frequency hopping receives an aperiodic CSI trigger, if the frequency hopping is disabled, the UE calculates and reports CQI under the assumption that the frequency hopping is not used. Or, the UE can calculate and report CQI for a repetition number and/or an NB (set) of the timing at which the aperiodic CSI trigger is received. To this end, a base station does not change a relevant configuration of the UE during a prescribed period and the UE may not expect an operation of changing the relevant configuration of the UE during the period.

And, an NB-IoT UE may additionally assume the following as a reference resource to calculate CQI.

The first 3 OFDM symbols are occupied by legacy control signaling for in-band operation, and no symbol is occupied by control signaling for standalone and guard band operation.

No resource elements used by primary or secondary synchronization signals or PBCH or EPDCCH.

CP length of the non-MBSFN subframes

CRS REs are as in non-MB SFN subframes for in-band operation, the CRS overhead is assumed to be the same as the CRS overhead corresponding to the number of CRS antenna ports of the serving cell if 'same-PCI indicator' is set to 'true' and the port number is signaled separately or same as the port number of NRS, or k port if 'same-PCI indicator' is set to 'false'

If CRS is used for channel measurements, the ratio of NRS EPRE to CRS EPRE is as signaled Assume no REs allocated for CSI-RS and zero-power CSI-RS Assume no REs allocated for PRS UE-specific reference signal overhead is zero In the foregoing description, the ratio of NRS EPRE to CRS EPRE is signaled because transmit power of the NRS is power boosted compared to the legacy CRS. Since transmission is performed in 1 RB in NB-IoT, channel estimation performance can be enhanced by signaling the ratio.

Figure 5:
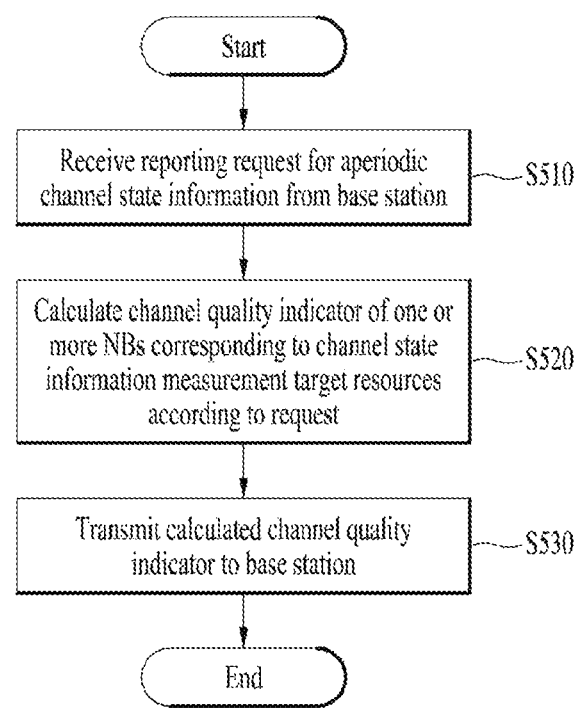
FIG. 5 is a flowchart illustrating an operation of a UE according to one embodiment of the present invention.
Figure 6:
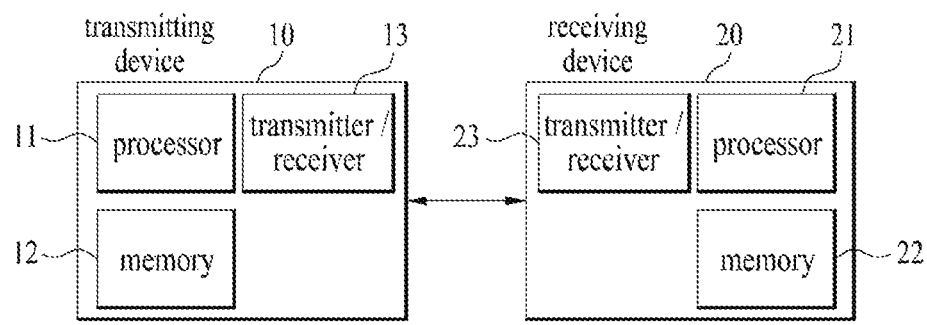
FIG. 6 is a block diagram of a device for implementing embodiment(s) of the present invention.

FIG. 5 is a flowchart illustrating an operation of a UE according to one embodiment of the present invention.

FIG. 5 illustrates a method of reporting a channel state for a NB-IoT (narrowband-Internet of Things) UE in a wireless communication system. The method is performed by an NB-IoT UE configured to operate on an NB in a unit of 1 RB (resource block). The UE can receive a report request of aperiodic channel state information from a base station [S510]. The UE can calculate a channel quality indicator of one or more NBs corresponding to channel state information measurement target resources according to the request [S520]. Subsequently, the UE can transmit the calculated channel quality indicator to the base station [S530]. The channel quality indicator is calculated during a valid subframe period including one or more subframes and the valid subframe period can exclude a subframe in which a synchronization signal is transmitted or a subframe in which an NB rather than the one or more NBs is monitored from the one or more NBs.

The channel quality indicator can be transmitted on an uplink data channel mainly used for reporting the aperiodic channel state information. And, a subframe in which the uplink data channel is to be transmitted can be indicated by control information that forwards a reporting request of the aperiodic channel state information. Or, the subframe in which the uplink data channel is to be transmitted can be designated by a subframe appearing after the certain number of subframes from a subframe in which the control information is received. And, the uplink data channel can be repeatedly transmitted as many as the number configured by the base station.

The report request of the aperiodic channel state information can include a repetition number which is considered at the time of calculating the channel quality indicator or information on a narrowband set.

And, the valid subframe period can include a repetition number configured for the UE or subframes corresponding to the maximum repetition number configured for the UE.

The channel state information measurement target resource can include all NBs capable of being used by the UE.

When the channel quality indicator is calculated, if the UE is configured by a guard band/standalone operation mode, it may assume that a symbol for control signaling does not exist in the channel state information measurement target resource. And, when the channel quality indicator is calculated, if a physical layer cell identifier-related indicator is set to true for the UE, it may assume CRS overhead corresponding to the number of cell-specific reference signal (CRS) antenna ports of the base station. And, when the channel quality indicator is calculated, if a CRS of the base station is used, a ratio of NB-RS (NRS) to EPRE (energy per resource element) per resource element of the CRS of the base station can be used for calculating the channel quality indicator.

In the foregoing description, embodiments of the present invention have been briefly explained with reference to FIG. 5. An embodiment related to FIG. 5 can alternatively or additionally include at least a part of the aforementioned embodiments.

FIG. 23 is a block diagram of a transmitting device 10 and a receiving device 20 configured to implement exemplary embodiments of the present invention. Referring to FIG. 23, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method of reporting a channel state for an NB-IoT (narrowband-Internet of Things) user equipment (UE) configured to operate within one resource block (RB) unit of NB in a wireless communication system, comprising:
receiving a reporting request of aperiodic channel state information from a base station;
obtaining a channel quality indicator of one or more NBs related to channel state information measurement target resources based on the request; and
transmitting the obtained channel quality indicator to the base station repeatedly in at least one uplink subframe,
wherein the channel quality indicator is obtained based on a valid subframe period including one or more subframes,
wherein the valid subframe period excludes a subframe in which a synchronization signal is transmitted in the one or more NB or a subframe in which a NB other than the one or more NBs is monitored by the UE,
wherein the channel quality indicator is transmitted together with information on a repetition transmission number used for obtaining the channel quality indicator,
wherein the repetition transmission number is determined by the UE among at least one candidate repetition transmission number, and the channel quality indicator is calculated by assuming the repetition transmission number that is determined by the UE, and
wherein the repetition transmission number used for obtaining the channel quality indicator is identical to a repetition transmission number of the at least one uplink subframe.

2. The method of claim 1, wherein the channel quality indicator is transmitted on an uplink data channel dedicatedly used for reporting the aperiodic channel state information.

3. The method of claim 2, wherein a subframe in which the uplink data channel is to be transmitted is informed by control information that carries the reporting request of the aperiodic channel state information, or the subframe in which the uplink data channel is to be transmitted is a subframe after a predetermined number of subframes from a subframe in which the control information is received.

4. The method of claim 2, wherein the uplink data channel is repeatedly transmitted as many as a number configured by the base station.

5. The method of claim 1, wherein the reporting request includes information on the at least one candidate repetition transmission number.

6. The method of claim 1, wherein the valid subframe period includes a predetermined number of subframes, the predetermined number related to a repetition transmission number configured for the UE or a maximum repetition transmission number configured for the UE.

7. The method of claim 1, wherein the channel state information measurement target resources include all NBs available to the UE.

8. The method of claim 1, wherein, based on the UE being configured as a guard band/standalone operation mode, the channel quality indicator is obtained based on the channel state information measurement target resources being without a symbol for control signaling.

9. The method of claim 1, wherein, based on information related to a physical layer cell identifier being set as true for the UE, the channel quality indicator is obtained based on a cell-specific reference signal (CRS) overhead being related to a number of CRS antenna ports of the base station.

10. The method of claim 1, wherein, based on a cell-specific reference signal (CRS) of the base station being used for obtaining the channel quality indicator, energy per resource element (EPRE) of the CRS to NB-reference signal (NRS) of the base station is received from the base station.

11. An NB-IoT (narrowband-Internet of Things) user equipment (UE) configured to receive a downlink signal in a wireless communication, the NB-IoT UE configured to operate within one resource block (RB) unit of NB, comprising:
a transmitter and a receiver; and
a processor that controls the transmitter and the receiver, wherein the processor is configured to:
receive a reporting request of aperiodic channel state information from a base station,
obtain a channel quality indicator of one or more NBs related to channel state information measurement target resources based on the request, and
transmit the obtained channel quality indicator to the base station repeatedly in at least one uplink subframe,
wherein the channel quality indicator is obtained based on a valid subframe period including one or more subframes,
wherein the valid subframe period excludes a subframe in which a synchronization signal is transmitted in the one or more NB or a subframe in which a NB other than the one or more NBs is monitored by the UE, wherein the channel quality indicator is transmitted together with information on a repetition transmission number used for obtaining the channel quality indicator, wherein the repetition transmission number is determined by the UE among at least one candidate repetition transmission number, and the channel quality indicator is calculated by assuming the repetition transmission number that is determined by the UE, and wherein the repetition transmission number used for obtaining the channel quality indicator is identical to a repetition transmission number of the at least one uplink subframe.

12. The UE of claim 11, wherein the channel quality indicator is transmitted on an uplink data channel dedicatedly used for reporting the aperiodic channel state information.

13. The UE of claim 12, wherein a subframe in which the uplink data channel is to be transmitted is informed by control information that carries the reporting request of the aperiodic channel state information, or the subframe in which the uplink data channel is to be transmitted is a subframe after a predetermined number of subframes from a subframe in which the control information is received.

14. The UE of claim 12, wherein the uplink data channel is repeatedly transmitted as many as a number configured by the base station.

15. The UE of claim 11, wherein the reporting request includes information on the at least one candidate repetition transmission number.

16. The UE of claim 11, wherein the valid subframe period includes a predetermined number of subframes, the predetermined number related to a repetition transmission number configured for the UE or a maximum repetition transmission number configured for the UE.

17. The UE of claim 11, wherein the channel state information measurement target resources include all NBs available to the UE.

18. The UE of claim 11, wherein, based on the UE being configured as a guard band/standalone operation mode, the channel quality indicator is channel quality indicator is obtained based on the channel state information measurement target resources being without a symbol for control signaling.

19. The UE of claim 11, wherein, based on information related to a physical layer cell identifier being set as true for the UE, the channel quality indicator is obtained based on a cell-specific reference signal (CRS) overhead being related to a number of CRS antenna ports of the base station.

20. The UE of claim 11, wherein, based on a cell-specific reference signal (CRS) of the base station being used for obtaining the channel quality indicator, energy per resource element (EPRE) of the CRS to NB-reference signal (NRS) of the base station is received from the base station.

* * * * *